Figure 1:
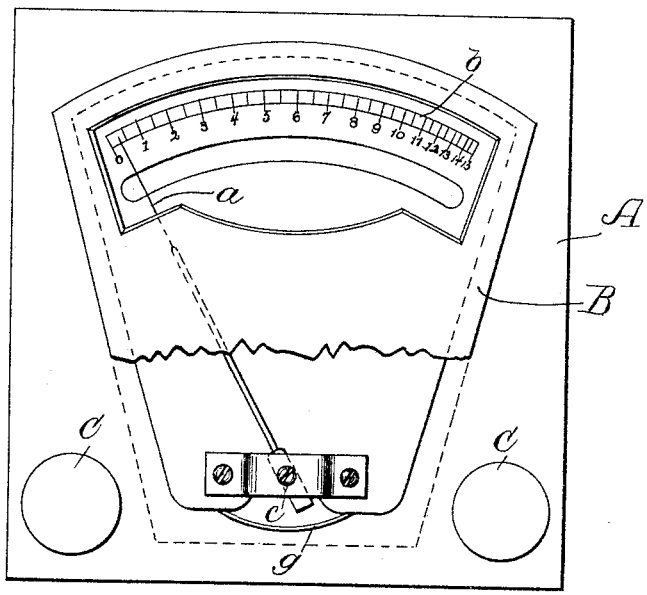

(No Model.)

A. H. HOYT.
ELECTRIC MEASURING INSTRUMENT.

No. 497,521. Patented May 16, 1893.

Witnesses
Jas. J. Maloney.
M. E. Hill.

Inventor,
Adrian H. Hoyt,
by Jno. P. Livermore
Att'y.

UNITED STATES PATENT OFFICE.

ADRIAN H. HOYT, OF MANCHESTER, NEW HAMPSHIRE, ASSIGNOR TO THE WHITNEY ELECTRICAL INSTRUMENT COMPANY, OF SACO, MAINE.

ELECTRIC MEASURING-INSTRUMENT.

SPECIFICATION forming part of Letters Patent No. 497,521, dated May 16, 1893.

Application filed November 14, 1891. Serial No. 411,904. (No model.)

*To all whom it may concern:*

Be it known that I, ADRIAN H. HOYT, of Manchester, county of Hillsborough, State of New Hampshire, have invented an Improvement in Electric Measuring-Instruments, of which the following description, in connection with the accompanying drawings, is a specification, like letters on the drawings representing like parts.

My invention is embodied in an instrument for indicating the strength of an electric current, being shown in this instance as applied to an ammeter or instrument for measuring the quantity of an electric current. The said instrument comprises a movable armature or needle with a pointer or indicator for showing in connection with a suitable graduated scale, the changes of position of said armature which is in the field of a permanent magnet that normally tends to retain it in definite position, and is also in such proximity to a solenoid or coil that an electric current in said solenoid tends to produce a magnetic field for said armature, the effect of which is to move the said armature from the position it normally occupies under the directive influence of the permanent magnetic field, the amount of such movements indicating the amount of the electric current traversing the solenoid by which the said movement is produced.

The invention consists mainly in providing means for making the position of the lines of force in the permanent field adjustable with relation to the armature so that although the said field may be regarded as permanent or constant when once adjusted during the observations of the current effect, the directive effect of said field on the needle may be adjusted from time to time as is found necessary. The means for adjusting the field are shown as consisting of a movable bridge or keeper in magnetic contact with the poles of the field magnet but being capable of movement with relation thereto, so that it can be set in different positions, said keeper being thus magnetized by the magnet and constituting a part of the field which is movable with relation to the armature and may thus be employed to vary or adjust the magnetic effect on the armature. The field magnet may also be provided with a variable or adjustable magnetic shunt shown in this instance as produced by iron screws or pins passing through the branches of the magnet at some distance from their poles and extending toward one another so that they constitute a partial magnetic circuit and prevent the magnetism at the poles from being as strong as it otherwise would. This device may be used to compensate for the variations in magnetic strength which takes place in a permanent magnet, the said pins being set near one another when the magnet is highly charged or of maximum strength so that the poles receive only a portion of the magnetism they otherwise would, and if the magnet is found to weaken the shunt projections can be separated more widely so that a larger portion of the magnetism will pass to the poles to afford the field for the indicating armature or needle. Thus by proper adjustments from time to time the field of the indicating armature may be retained constant although the strength of the magnet itself may vary.

Figure 2:
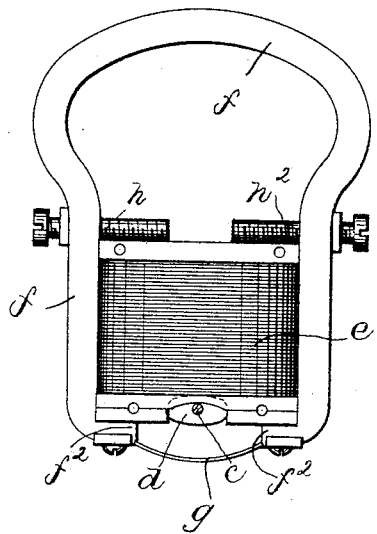
Figure 3:
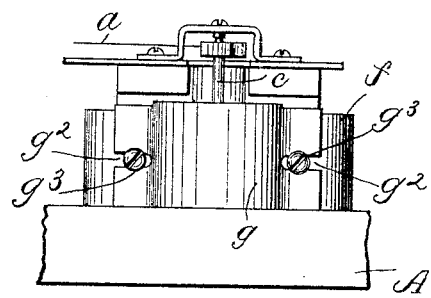

Figure 1 is a plan view of an indicating instrument embodying this invention, a portion of the inclosing case being broken away to show the parts below; Fig. 2 a plan view of the field magnet, coil, and armature, the pivoted arbor of the latter being shown in section, and Fig. 3 a front elevation of the instrument with the inclosing case removed.

The operative parts of the instrument are shown as supported on a base plate A provided with a removable cover or inclosing case B having an opening through which the pointer $a$ and indicating scale $b$ may be observed. The said pointer $a$ is fixed upon an arbor $c$ supported in suitable pivots so as to turn freely and having fixed upon it an armature or needle $d$ see Fig. 2, which is within the magnetic field produced by a solenoid or coil $e$ Fig. 2, through which the currents to be measured are caused to pass in the usual manner the terminals of said coil being connected with suitable binding clamps C Fig. 1, to receive the wires carrying the current to be measured. The effect of a current passing through the coil $e$ is to produce a magnetic field tending to turn the armature $d$ into line with the axis of the said coil or in other words into a position substantially at right angles to that shown in Fig. 2, and this tendency varies with the amount of current traversing the said coil.

In order to resist the tendency of the current to turn the armature so that the amount that the armature is turned may be used to indicate the amount of current traversing the coil, the said armature is also affected by a permanent magnetic field produced by a permanent magnet $f$ which may be of the usual U or horse-shoe shape, having its poles $f^2$ about in line with the ends of the armature $d$ when in normal position shown in Fig. 2, and thus tending to keep the said armature in said postion or with its greatest length in the line between the poles $f, f^2$, and thus affording a determinate resistance to the tendency of the current in the coil $e$ to turn the said armature into line with its axis.

In order to regulate more thoroughly the effect of the permanent field upon the armature $d$ than can be done by the proximity of the fixed poles $f^2$, and also govern the position of the lines of force relative to the armature $d$ so that the resistance to its movement by the solenoid may be more constant than would be the case if it were acted upon only by the force directly from the poles $f^2$, the instrument is in accordance with this invention, provided with an adjustable field piece shown as a bridge or keeper $g$ of magnetic material extending from one pole to the other of the magnet $f$ and being in magnetic contact therewith, the said bridge piece being comparatively light or of thin metal, so as not to absorb to too great an extent the magnetism of the magnet $f$. The said bridge piece $g$ is curved in shape as shown, forming an arch around the axis of the armature $d$ and by sliding the said bridge $g$ transversely along the poles its magnetic effect upon the armature $d$ will be varied producing a corresponding variation in the position of the armature $d$. Thus by sliding the keeper $g$ laterally on the poles of the magnet a small amount such as is provided for by the slots $g^2$ see Fig. 3, which fit over fastening screws $g^3$ a movement of the pointer $a$ over one or more divisions of the scale may be effected, thus affording a convenient means for adjusting the pointer if necessary before making a current observation.

The curved or arched shape of the field produced by the employment of the curved keeper $g$ makes the field resistance to the rotation of the armature more uniform in the different positions of the latter so that the divisions on the scale $b$ see Fig. 1, may be more uniform in length than is the case when the armature or needle $d$ is exposed only to the influence of two opposite definitely located poles as is usual in instruments of this kind.

In order to provide means for keeping the field of force for the armature or needle $d$ substantially constant although the magnet $f$ may vary in strength or fall off in magnetism, the said magnet is in accordance with this invention provided with an adjustable partial magnetic shunt, shown in Fig. 2, as consisting of two screws or projections $h, h^2$, extending toward one another between the branches of the magnet at some distance from the actual poles $f, f^2$, of the magnet, the said projections $h^2$ constituting what may be regarded as secondary poles and diverting a portion of the magnetic effect from the main poles $f^2$ the said portion varying with the degree of proximity of the poles $h, h^2$. Thus when the magnet is strongly charged the said adjustable shunt poles $h, h^2$, may be placed quite near together so that only a comparatively small portion of the full strength of the magnet $f$ is effective at its poles $f^2$ the instrument being graduated to indicate properly with such a field. Then if the magnet is found to weaken the field may be brought up to normal strength by drawing the shunt poles $h, h^2$, farther apart so that although the magnet is weaker a larger percentage of its strength is effective at the poles $f^2$.

I claim—

1. An electrical indicating instrument comprising a field magnet and an indicating armature or needle pivoted in the field thereof, combined with a bridge or keeper connecting the poles of the said magnet, and modifying the effect of the magnetic field upon said needle, substantially as described.

2. An electrical indicating instrument comprising a field magnet and an indicating armature or needle pivoted in the field thereof, combined with a bridge or keeper connecting the poles of the said magnet, and laterally adjustable thereon, the said keeper deviating from the direct line between the poles so that its adjustment on said poles varies the magnetic effect on the indicating needle, substantially as described.

3. An electrical indicating instrument comprising a field magnet and an indicating armature or needle pivoted in the field thereof, combined with adjustable secondary poles constituting a magnetic shunt whereby the effective strength of the field relative to the strength of the magnet may be varied, substantially as and for the purpose described.

In testimony whereof I have signed my name to this specification in the presence of two subscribing witnesses.

ADRIAN H. HOYT.

Witnesses:
 JOS. P. LIVERMORE,
 M. E. HILL.